US012646668B2

(12) United States Patent
Mujawar et al.

(10) Patent No.: US 12,646,668 B2
(45) Date of Patent: Jun. 2, 2026

(54) DEVICE FOR DISCONNECTING AN ELECTRICAL CIRCUIT

(71) Applicant: EATON INTELLIGENT POWER LIMITED, Dublin (IE)

(72) Inventors: Asad Mujawar, Mohammadwadi (IN); Roger Burkett, Leicestershire (GB)

(73) Assignee: EATON INTELLIGENT POWER LIMITED, Dublin (IE)

(*) Notice: Subject to any disclaimer, the term of this patent is extended or adjusted under 35 U.S.C. 154(b) by 299 days.

(21) Appl. No.: 18/559,717

(22) PCT Filed: May 11, 2022

(86) PCT No.: PCT/EP2022/025222

§ 371 (c)(1),
(2) Date: Nov. 8, 2023

(87) PCT Pub. No.: WO2022/238013

PCT Pub. Date: Nov. 17, 2022

(65) Prior Publication Data

US 2024/0234054 A1 Jul. 11, 2024

(30) Foreign Application Priority Data

May 12, 2021 (IN) ............................ 202111021402
Jun. 23, 2021 (GB) .................................... 2109014

(51) Int. Cl.
*H01H 19/14* (2006.01)
*H01H 19/04* (2006.01)

(52) U.S. Cl.
CPC ............ *H01H 19/14* (2013.01); *H01H 19/04* (2013.01)

(58) Field of Classification Search
CPC ........ H01H 19/14; H01H 19/04; H01H 19/11; H01H 19/585; H01H 19/58; H01H 19/62;
(Continued)

(56) References Cited

U.S. PATENT DOCUMENTS 3,260,808 A 7/1966 Dimond et al.
9,425,588 B2 * 8/2016 Fischer .................... H02B 1/26
(Continued)

FOREIGN PATENT DOCUMENTS

FR 2864333 A1 6/2005

*Primary Examiner* — Ahmed M Saeed
(74) *Attorney, Agent, or Firm* — LEYDIG, VOIT & MAYER, LTD.

(57) ABSTRACT

A device comprising: a contact mechanism (or switch); an actuation knob; and a housing. The contact mechanism (or switch) comprises: an actuating mechanism; a first conductor; a second conductor; and a moveable contact moveable, by the actuating mechanism, between a first, closed, position in which a current conduc-tion path is defined through the first, second and moveable conductors of the contact mechanism and a second, open, position in which no current conduction path is defined. The actuation knob (or knob) comprises: a first side configured to drive the actuating mechanism upon rotation of the actuation knob, the first side comprising a cam portion which directly engages with the actuating mechanism; a second side opposite the first side; and an engagement portion protruding from the second side and configured for engagement by a user. The housing encloses both the contact mechanism and the first side of the knob.

20 Claims, 6 Drawing Sheets

(58) Field of Classification Search

CPC ...... H01H 19/635; H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01; H01H 3/08; H01H 71/56; H01H 2071/565; H01H 9/282; H01H 2219/036; H01H 2219/0621; H01H 71/04; H01H 9/04; H01H 9/161; H01H 9/22; H01H 9/281

See application file for complete search history.

(56) References Cited

U.S. PATENT DOCUMENTS

| | | | |
|---|---|---|---|
| 2014/0262711 | A1 | 9/2014 | Clark |
| 2015/0221459 | A1 | 8/2015 | Oneufer et al. |

* cited by examiner

DEVICE FOR DISCONNECTING AN ELECTRICAL CIRCUIT

FIELD

This relates to a device for disconnecting an electrical circuit. In particular, this relates to a device for disconnecting an electrical circuit which is configured to receive locking means in an integrated manner.

BACKGROUND

A switch-disconnector, disconnect device or isolator switch is used to break a current conduction path to ensure that an electrical circuit is de-energized and safe for service or maintenance. Such switch-disconnectors or switches are often found in electrical distribution and industrial applications. Switch-disconnectors can be operated either manually or automatically.

It is important for safety reasons that such devices can be locked to prevent accidental or unauthorised operation of the devices. Previous approaches to locking the device have relied on moveable locking links which slide or rotate into position, or have provided an external handle which can be used with an external locking arrangement.

There is a need for a simpler, sturdier and less complicated lockable device, which has a reduced manufacturing/assembly cost and complexity as compared to other known disconnector devices.

US 2014/262711 A1 discloses a sealed switch assembly for use with a disconnect operator movable between an on state, a tripped state, and an off state. The disconnect operator housed within a sealed enclosure. The switch assembly includes a housing sealed to the enclosure to inhibit ingress of solids and liquids therebetween. A handle is coupled to the disconnect operator and is disposed at least partially within the housing. The handle is sealed to the housing to inhibit ingress of solids and liquids there between, and is moveable between an on position and an off position. A low-friction trip indicator mechanism operates independent of the handle to indicate when the disconnect operator is in the tripped state.

U.S. Pat. No. 3,260,808 A discloses a switch operating mechanism including a rotary type handle surrounded by a raised locking or guard ring. The handle includes a slidable locking bolt which is movable radially outwardly of the handle, and the guard ring is provided with a clearance notch or notches at locations corresponding to the angular positions, such as “on” and “off”, at which it is desired to lock the handle. The slidable bolt has an opening therein to receive a padlock to prevent movement of the bolt inwardly when in a desired locking position.

US 2015/221459 A1 discloses disconnect operating handles for circuit breakers which are configured with a rotary handle attached to an inwardly oriented shaft that connects to a gear assembly that translates rotational input to linear input. The disconnect operating handles include pivoting lockout levers that can automatically “pop” out to expose the lockout space for a padlock when a user touches the lever in an appropriate location.

FR 2864333 A1 discloses a knob which has a body and a handle mounted around an axis of the body for activating an electrical interrupter block. A light source is housed in the body with light emission being aligned along the axis. A hollow gripping lug contacts with a disk that covers a base. The base is made of opaque material and mechanically resistant material, and the disk and the gripping lug are made of translucent colour material.

SUMMARY

The following specification relates to a device, which device allows for disconnection or interruption of an electrical circuit in response to actuation of a knob. The knob is integrated into the device to facilitate locking of the device in a robust manner.

In a first aspect, a device is provided as defined in appended independent apparatus claim 1, with optional features defined in the dependent claims appended thereto. In a second aspect, a system comprising the device of the first aspect is provided, as defined in the appended independent system claim.

In accordance with the first aspect, there is provided a device. The device comprises: a contact mechanism (or switch), an actuation knob, and a housing. The contact mechanism (or switch) comprises: an actuating mechanism; a first conductor; a second conductor; and a moveable contact moveable, by the actuating mechanism, between a first, closed, position in which a current conduction path is defined through the first, second and moveable conductors of the contact mechanism and a second, open, position in which no current conduction path is defined. The actuation knob (or knob) comprises: a first side configured to drive the actuating mechanism upon rotation of the actuation knob, the first side comprising a cam portion which directly engages with the actuating mechanism; a second side opposite the first side; and an engagement portion protruding from the second side and configured for engagement by a user. The housing encloses both the contact mechanism and the first side of the actuation knob, the engagement portion configured to protrude through an opening in the housing. The actuation knob is configured to rotate within the housing in response to engagement by a user.

The device described herein can facilitate a knob which is assembled within the housing, allowing the actuation knob to be locked into (or retained by) the housing. This arrangement can prevent easy removal of the knob from the front of the device. Since the knob may be padlocked or otherwise locked with locking means to the housing, the device described herein may improve safety. In particular, since it is not possible to override the physical locking means just by removing the knob, the device is more difficult to override when locked.

In some examples, one or more first apertures are formed within the housing and one or more second apertures are formed within the actuation knob. In some examples, the one or more first apertures are configured to align with the one or more second apertures when the moveable contact is in the second, open, position. These apertures provided an integrated way of locking the device, reducing or removing the need for movable locking linkages.

When the one or more first apertures are configured to align with the one or more second apertures, the housing and the actuation knob can be configured to receive one or more locking means through the aligned first and second apertures to prevent rotation of the actuation knob within the housing. This arrangement can allow the device to be locked “off” with one or more padlocks or locking means. Moreover, when two first and second apertures are provided, locking means can be passed through each set of aligned apertures. In some examples, one separate padlock or locking means can be arranged through each aligned set of apertures.

Redundancy can be therefore be provided by having two means for locking off, facilitating a device with improved safety.

In some examples, the one or more first apertures are configured not to align with the one or more second apertures when the moveable contact is in the first, closed, position. This prevents the device being locked "on", which can be a safety requirement in some applications. In other examples, one or more third apertures can be formed within the housing, wherein the one or more third apertures are configured to align with the one or more second apertures when the moveable contact is in first, closed, position. This allows the device to be locked on, which may be needed in some applications.

The one or more second apertures are formed at least partially within an edge of the actuation knob. The edge may be a solid edge extending between the first and second sides of the knob, or can be a lipped edge. The one or more second apertures may also be partially formed within the first or second side of the knob, as appropriate for the arrangement of the device.

In some examples the actuation knob is configured to rotate within the housing in response to direct engagement by the user. In some examples, the device further comprises a handle which is coupled to the engagement portion of the actuation knob. The handle is configured for direct engagement by the user, such that the actuation knob is configured to rotate within the housing in response to indirect engagement by the user. The term "knob", as used herein, refers to the component which directly engages the actuating mechanism. The actuating mechanism will be understood as being indirectly engaged by the "handle", which is a separate component to the knob. Since the handle is coupled to the protruding engagement portion of the knob as an optional and removable component, it will be understood that the handle cannot be retained within or enclosed by the housing as the actuation knob is.

The engagement portion and the cam portion of the actuation knob can be integrally formed as a single component. The use of a single integral component can reduce part count and save assembly time, as well as preventing removal of the knob from the housing (since the housing may need to be disassembled to remove the knob). In some examples, the actuation knob is a single moulded component (i.e. formed by moulding). This can facilitate provision of a cheaper and stronger component, which is also relatively quick to manufacture. A simpler, cheaper device may therefore be provided.

In some examples, the housing is configured to extend over a lipped portion of the second side of the actuation knob to retain the knob within the housing. In some examples, the housing is additionally or alternatively configured to extend across at least a planar portion of the second side of the actuation knob to retain the knob within the housing. In this way, the actuation knob can be retained within the housing in a simple manner.

The device may further comprise a circular bearing disposed between the second side of the actuation knob and the housing. In some examples, the circular bearing can be disposed between the lipped portion of the second side and the housing. The use of a bearing can facilitate rotation of the actuation knob within the enclosing housing enclosure and reduce wear.

In some examples, the housing forms or defines a single cavity of void. In other examples, the housing comprises a main portion which encloses the contact mechanism and a cover portion coupled to the main portion. The first side of the actuation knob is disposed between the main portion and the cover portion and enclosed within a cavity formed by the main portion and the cover portion. The cover portion of the housing can then be configured to extend across at least a portion of the second side of the actuation knob. This arrangement of different housing portions can facilitate assembly of the knob and actuating mechanism at a later point in time than the rest of the switch mechanism. Moreover, by fitting the knob within a cover portion, retrofitting of the knob may be facilitated.

In accordance with the second aspect, a system is also provided. The system comprises the above-described device of the first aspect, with any of the optional features or arrangements described herein, and an electrical circuit configured to be coupled to the first and second conductors of the contact mechanism.

It will be understood that any of the features described above with reference to the device of the first aspect may be provided in any suitable combination. Moreover, any such features may be combined with any features of the method of the second aspect, or vice-versa, as appropriate.

BRIEF DESCRIPTION OF THE DRAWINGS

The following description is with reference to the following Figures.

DETAILED DESCRIPTION

Figure 1A:
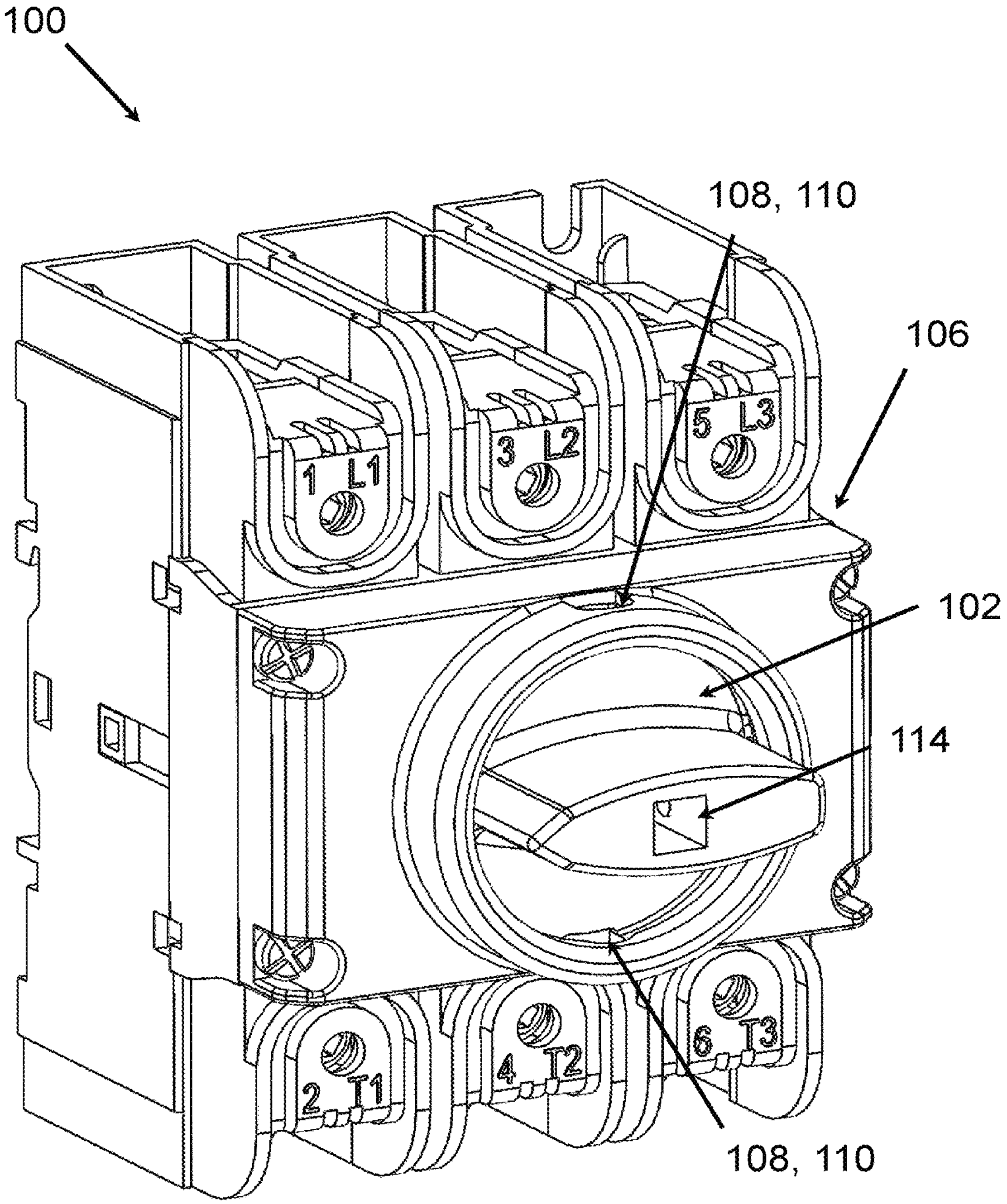
FIG. 1A illustrates a first perspective view of a device in accordance with an example of the first aspect, the device arranged in an open position in which no current conduction path is defined through the device.
Figure 1B:
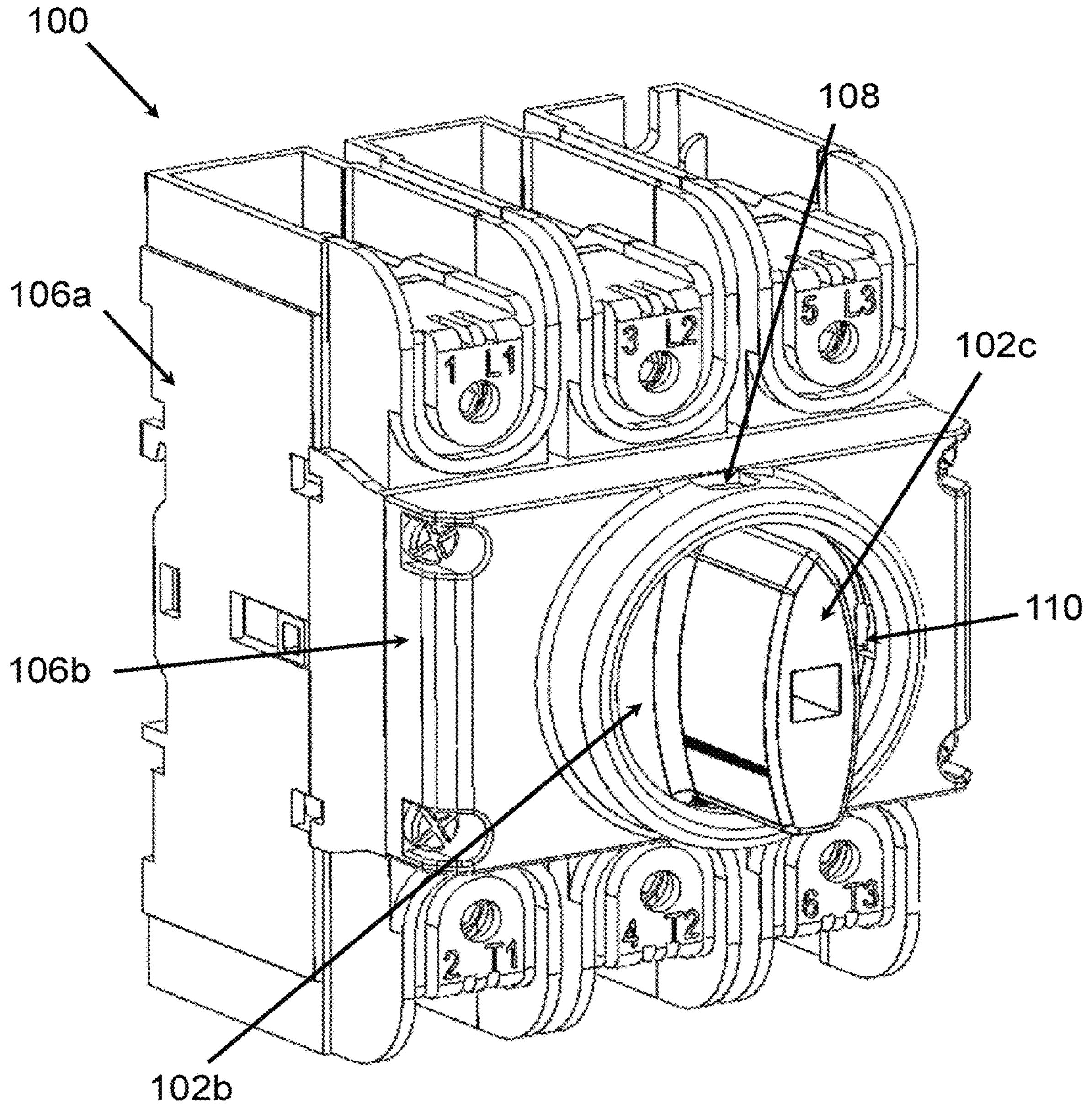
FIG. 1B illustrates a second perspective view of the device of FIG. 1A, the device arranged in a closed position in a current conduction path is defined through the device.
Figures 1, 2A:
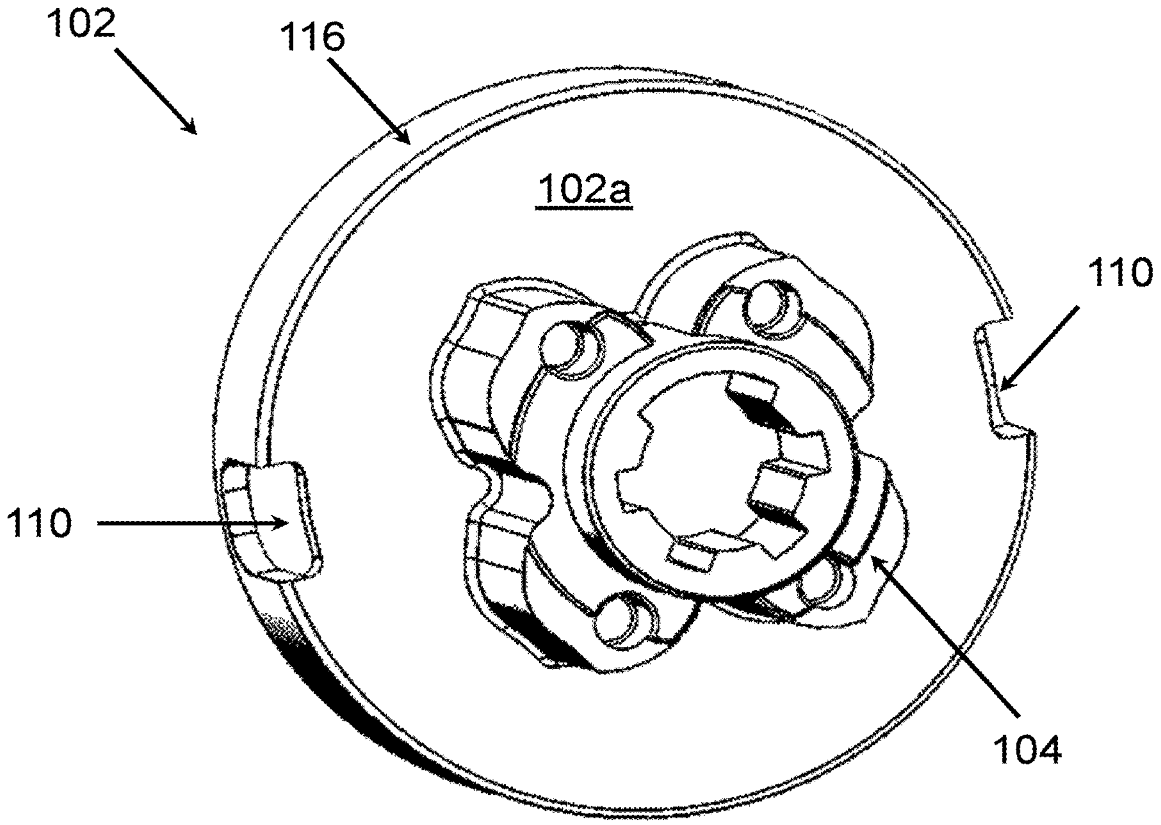
FIG. 2A-1 illustrates a perspective view of a first side of an example knob of the device of FIGS. 1A and 1B and FIG. 2A-2 illustrates a perspective view of a second side of the example knob of FIG. 2A-1.

With reference to FIG. 1 (FIG. 1A and FIG. 1B) a device 100 is described. The device comprises an integrated actuation knob, and the arrangement described herein can facilitate locking of the device in a robust manner. In particular, locking means can be received by the device without the need to slide or rotate any additional locking links.

Device 100, which can be any a disconnect device or any other form of switch, comprises a contact mechanism or switch (not shown), an actuation knob (or simply knob) 102 configured to drive the contact mechanism, and a housing 106 enclosing the contact mechanism/switch and at least part of the actuation knob. As described herein, the term "knob" is used to mean the component which directly operates or drives the contact mechanism. The knob can be directly engaged by a user, or indirectly engaged by a "handle", which couples to the knob via one or more shafts or linkages to indirectly drive the contact mechanism.

The contact mechanism/switch comprises a first conductor and a second conductor. In some examples, only a first, fixed, contact terminal of the first conductor and a second, fixed, contact terminal of the second conductor are included within the device 100. The first and second conductors are configured for electrical connection to an external electrical circuit. A moveable contact is moveable into and out of electrical contact with the first and/or second conductors (optionally with the first and/or second contact terminals) to close and open the current conduction path. The current conduction path is defined through the first, second and moveable conductors of the contact mechanism. In other words, the current conduction path is defined through the contact mechanism via the first, second and moveable conductors.

In particular, the contact mechanism comprises an actuating mechanism configured to move the moveable contact between a first, closed, position in which a current conduction path is defined through the contact mechanism (an ON position, where the moveable conductor is in electrical contact with both the first and second conductor terminals) and a second, open, position in which no current conduction path is defined (an OFF position, where there is no electrical contact between the moveable conductor and one or both of the first and second conductor terminals). FIG. 1A illustrates the device in the open, OFF, position where no current flows through the device. FIG. 1B illustrates the device in the closed, ON, position where current flows through the conduction path defined through the contact mechanism of device 100.

The knob 102 is configured to drive the actuating mechanism to move the moveable contact. In particular, the knob comprises a first side (not shown in FIG. 1, see 102*a* of FIG. 2) configured to drive the actuating mechanism upon rotation of the actuation knob. To drive the actuating mechanism, the first side comprises a cam portion (not shown in FIG. 1, see 104 of FIG. 2) which is configured to directly engage with the actuating mechanism of the contact mechanism/switch to operate the contact mechanism/switch. The knob 102 also comprises a second side 102*b* opposite the second side and an engagement portion 102*c* which protrudes from the second side 102*b* and is configured for engagement by a user. The second side may be substantially planar, or may comprise a planar portion and a lipped portion extending from the planar portion.

In other words, the cam portion and the engagement portion are part of a single, integral component. Force applied to the engagement portion by a user is directly transferred, by rotation of the actuation knob (and thus rotation of the cam portion), to the actuating mechanism. By directly engaging the actuating mechanism, the device may have better resistance to over-torque of the knob by a user (as compared to devices which have one or more linkages coupling the engagement portion to the cam).

The housing 106 of the device 100 encloses both the contact mechanism and the first side 102*a* of the actuation knob. In some examples, the housing 106 may also extend across at least a portion of the second side of the actuation knob. In this way, the knob 102 can be located within and surrounded by the housing 106. This can help prevent removal of the knob from the device after the device is installed or whilst the device is in operation, since the actuation knob 102 cannot be removed without opening the housing 106 (with some known approaches, the knob is secured with a single screw and can be removed from the device, therefore obviating the locking means). In other words, the actuation knob 102 is retained by the housing. A safer device 100 may therefore be provided.

In some examples, one or more circular bearings may be disposed between the second side 102*b* of the actuation knob and the housing 106. In arrangements where the knob 102 comprises a lipped portion, the circular bearing(s) can be located, disposed, or otherwise arranged between the housing 106 and the lipped portion of the actuation knob 102. However, the circular bearing(s) may be arranged in any other suitable location, which location can be dependent on the particular geometry of the actuation knob and housing. The use of such a bearing can facilitate improved rotation of the knob 102 within the housing 106 and reduce wear of the components, improving life span of the device 100.

The engagement portion 102*c* is configured to protrude through an opening in the housing so that it is accessible to a user for direct engagement of the knob 102, or so that it can be coupled to an external handle for indirect engagement by a user. For example, an external handle (not shown) may be coupled to the knob 102 at aperture or recess 114 in the engagement portion 102*c*. By coupling an external handle to the knob 102, the device 100 may be placed inside a cabinet or enclosure and still operated from outside the cabinet by extending the handle through the walls of the enclosure/cabinet.

In some examples described with reference to FIG. 1, the housing comprises a main portion 106*a* which encloses the contact mechanism and a cover portion 106*b* coupled to the main portion. The first side of the actuation knob is disposed between the main portion 106*a* and the cover portion 106*b* and enclosed within a cavity formed by the main portion and the cover portion. The engagement portion 102*c* is configured to extend or protrude through an opening in the cover portion 106*b* of the housing 106. In some examples, it is the cover portion 106*b* of the housing which is configured to extend across at least a portion of the second side of the actuation knob. In other examples, the housing may comprise a single void or cavity in which the contact mechanism and the actuation knob are both disposed.

The knob 102 is arranged such that it is configured to rotate within the housing 106 in response to engagement by a user. In other words, the knob 102 is configured to rotate upon engagement of the engagement portion 102*c* by a user. This rotation causes rotation of the cam portion 104 on the first side 102*a* of the knob, which cam rotation in turn drives the actuating mechanism. Operation of the device 100 is discussed further below with reference to FIG. 3.

The housing 106 (or the cover portion 106*b* of the housing, depending on the implementation) can further comprise one or more first apertures 108 formed within the housing. The first apertures can be arranged in a portion of the housing proximate an edge of the knob (the edge 116 can extend between the first and second sides or can protrude upwards from the second side 102*b*, as shown with respect to the examples of FIG. 2). In other words, the housing can enclose the first side of the knob and extend around the edge of the knob, coming up around (or over) the edge 116 and optionally at least partly extending across a planar portion of the second side 102*b* of the knob. One or more second apertures 110 can be formed within the actuation knob. In some examples, the apertures 110 are formed at least partially within the edge of the knob.

In the example of FIG. 1A, where the device 100 is in the second, open (or OFF) position, the apertures 108, 110 are configured to align. The housing and the actuation knob are configured to receive one or more locking means (not shown) through the aligned first and second apertures. In this way, a single locking means can be inserted through the aligned apertures 108, 110 and pass through both the housing 106 and the knob 102 to prevent rotation of the actuation knob within, or relative to, the housing. This can allow the device to be locked in an OFF position.

In the particular example shown in FIG. 1A, there are two first apertures 108 and two second apertures 110. A single locking means can pass through the one or more aligned apertures 108, 110, or one locking means can be inserted into each set of aligned apertures 108, 110 so that more than one locking means can be provided. By providing more than one point of locking contact, the robustness of the locking mechanism can be improved. By providing redundancy in the locking, safety may also be improved.

In the example of FIG. 1B, where the device 100 is in the first, closed (or ON) position, the apertures 108, 110 are not configured to align. In other words, the second aperture(s) 110 are not accessible from the outside of the housing 106. This can prevent the device from being locked in the ON position, which can improve safety. However, in other examples (not shown), one or more third apertures may be formed within the housing. The third aperture(s) may be configured to align with the one or more second apertures 110 when the moveable contact is in first, closed, position in order that the device can be locked into the ON position, which may be desirable in some applications.

The arrangement described herein can facilitate locking of the device 100 in a simple and robust manner, without the need for additional moving parts or locking links. In particular, the knob 102 can be locked directly to, or within, the housing 106 by passing locking means (such as a padlock) through the integrally formed apertures. This can provide a stronger solution as compared to known approaches which rely on movable locking links to lock the knob to the housing, since these links can break if over-torque is applied to the knob. By integrating the locking directly into the body of the knob 102, the device 100 can be stronger and more robust. Moreover, the provisions for locking the device can be achieved with fewer parts, reducing assembly time and material cost. A cheaper and more robust device may therefore be provided.

Figures 2, 2A:
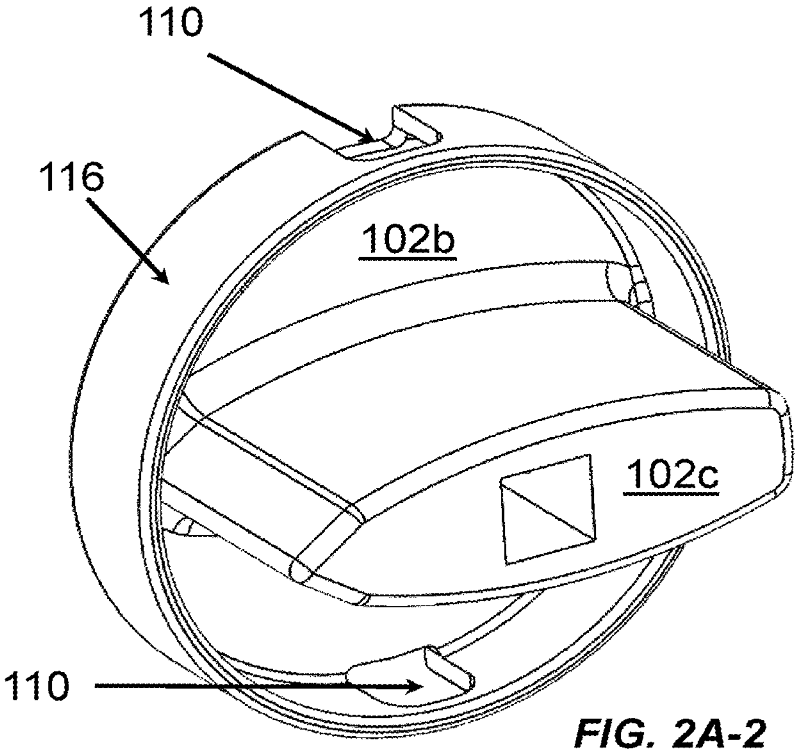

With reference to FIG. 2 (FIGS. 2A-1 and 2A-2, 2B and 2C), the actuation knob 102 is discussed in more detail. In FIG. 2A-1, the first side 102*a* of the knob is seen, which first side comprises a cam portion 104 configured to directly engage the actuating mechanism of the contact mechanism/switch. In FIG. 2A-2, the second side 102*b* of the knob is seen, with the engagement portion 102*c* shown protruding from the second side. In this example of the knob 102, a lipped portion 116 extends from the planar portion of the second side 102*b* and around the perimeter of the second side.

Upon rotation of the knob 102 around axis 120, for example by a handle 103 coupled to the engagement portion 102*c* (see e.g. FIG. 2B or FIG. 2C, where rotation is shown in one direction but it will be understand that rotation can be in either direction around axis 120), the cam portion 104 acts to displace or compress part of the actuating mechanism by applying a driving force in one or more directions 122 perpendicular to axis 120. Additional driving forces can be transmitted by rotation of the knob 102 to other parts of the actuating mechanism, as appropriate. The exact means by which the cam portion 104 drives the actuating mechanism will depend on the particular configuration of the contact mechanism/switch, which can itself depend on the application for which the application is intended. An example actuating mechanism is discussed further with reference to FIG. 3.

The actuation knob 102 can be integrally formed, i.e. formed as a single component. In some examples, the actuation knob can be moulded as a single component. This approach can facilitate provision of a cheap and strong component for use as the knob 102. Moreover, by integrally forming the cam portion 104 and the engagement portion 102*c* into a single knob 102, the part count for the device 100 may be reduced, which can reduce assembly and manufacturing costs (both in terms of time and materials). The use of a single integrated component can also help stop disassembly of the knob 102 from the housing 106.

Figure 2B:
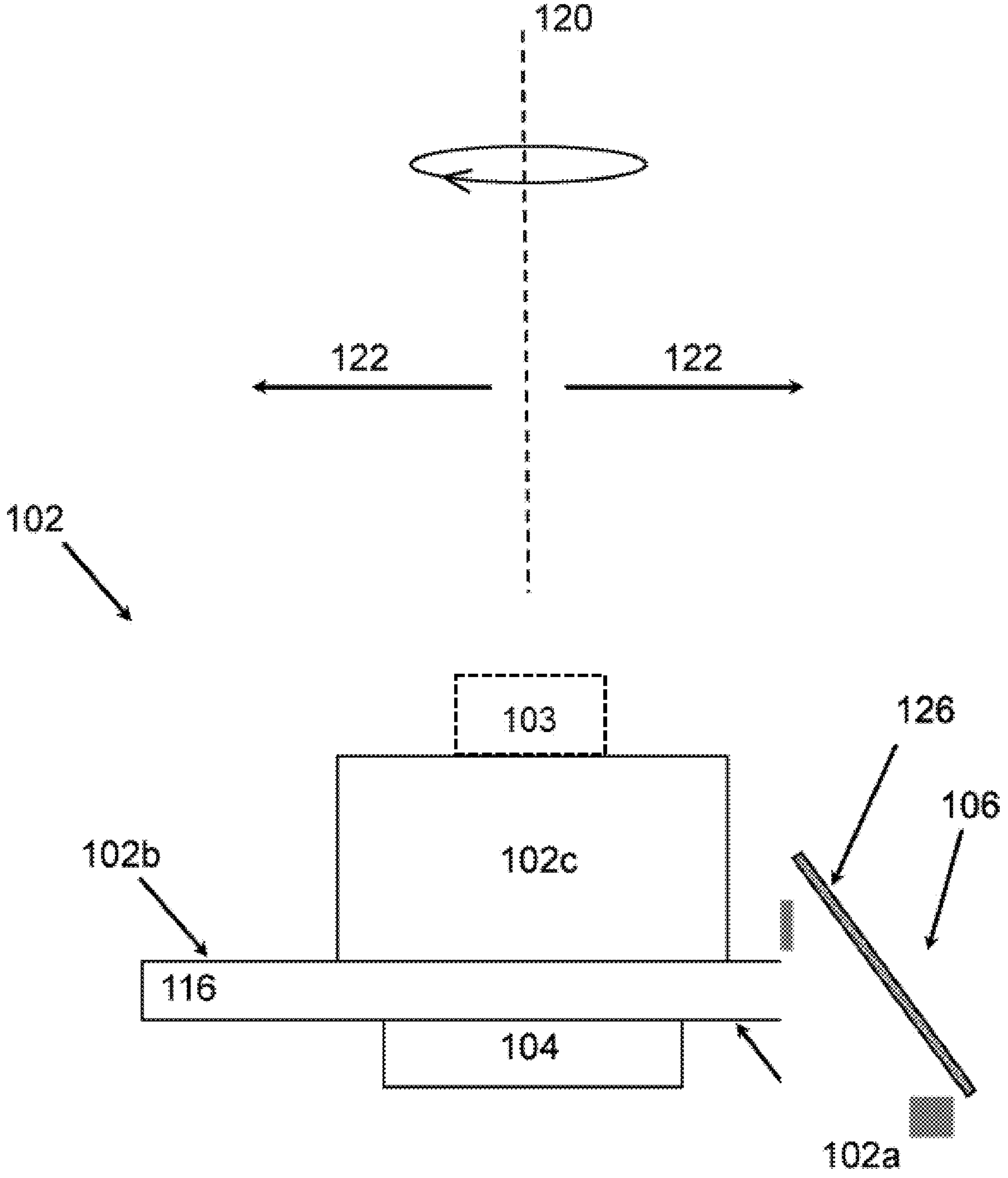
FIG. 2B illustrates a schematic cross-sectional view of example knob.
Figure 2C:
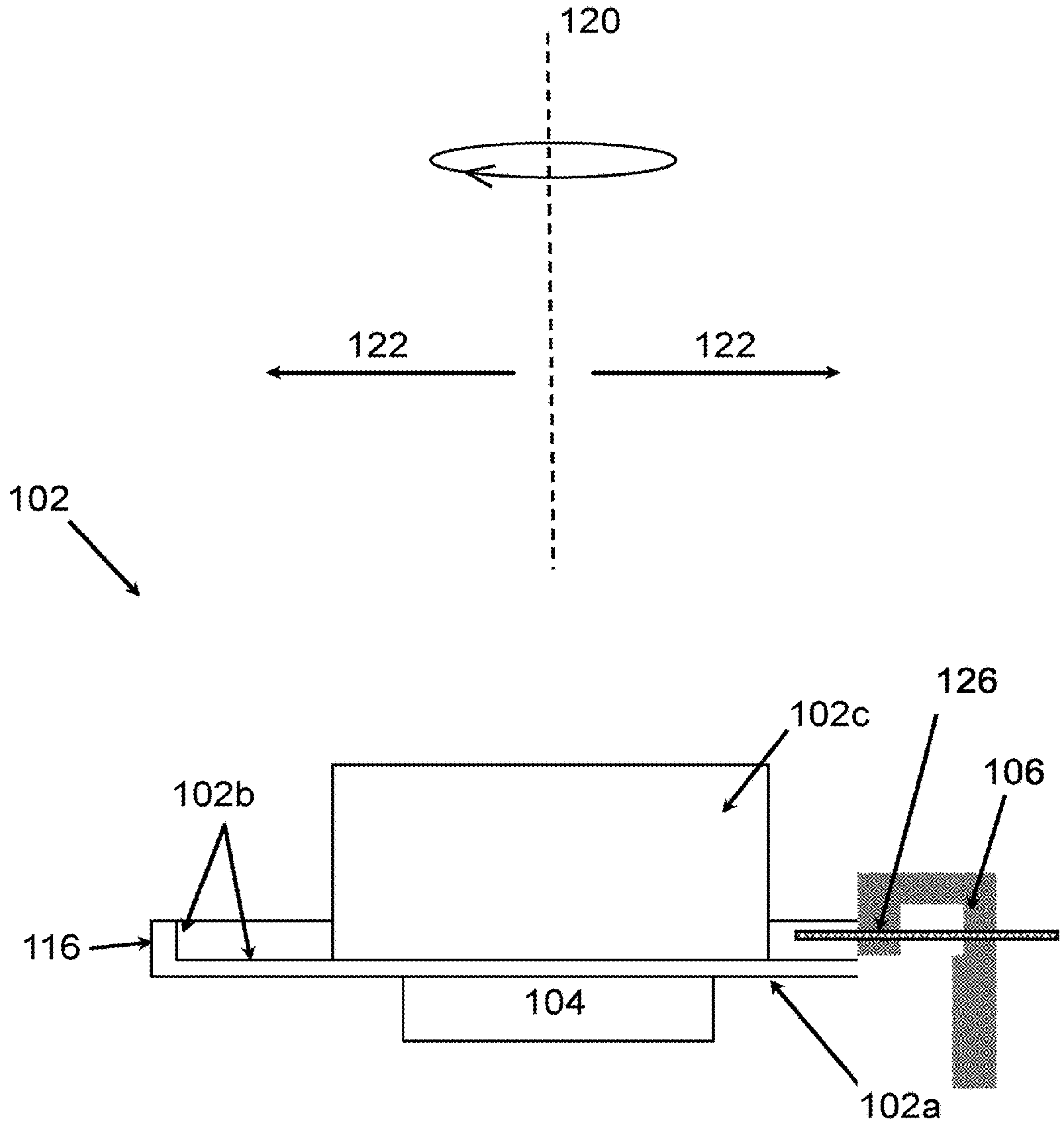
FIG. 2C illustrates a schematic cross-sectional view of another example knob.

In one example shown in FIG. 2C (and as discussed above with reference to FIGS. 2A-1 and 2A-2), the knob 102 may be formed such that the edge 116 protrudes away from the second side (not shown). In other words, the edge 116 can form a lip which extends around and from the perimeter of the second side of the knob 102, as shown in FIG. 2C. The second side can be considered to encompass the interior side of the lipped edge 116 (i.e. to comprise a lipped portion as well as a planar portion). In other words, the housing being configured to extend across the second side can comprise the housing extending over the lip and optionally also at least partly across the planar portion of the second side 102*b*.

For example, the housing may be configured to receive the lipped edge and retain the knob 102 by extending over the lipped part of the second side 102*b*, as is shown in FIG. 2C and FIG. 3. The housing may also extend further, across part of the planar portion of the second side 102*b* (this portion of the housing is not shown here). In the example of FIG. 2C, the portion of the housing around the knob 102 is arranged or formed with a hooked, or U shape. In this way, the knob 102 can be retained within the housing and movement of the knob in a direction along axis 120 can be reduced or prevented. The first and second apertures (not shown) can be formed in the housing 106 and knob 102, respectively, such that (when the first and second apertures are aligned) locking means 126 can extend through both the housing 106 and the knob 102 to facilitate locking of the knob within the housing to prevent rotation of the knob 102 by a user.

In another example, such as shown with reference to the schematic of FIG. 2B, the edge 116 can extend between the first and second sides 102*a*, 102*b* of the knob, i.e. there is no lip and the second side 102*b* is substantially planar (with the engagement portion 102*c* extending from the planar portion). It will be understood that the housing is again configured to accommodate the knob. In the example of FIG. 2B, the housing 106 extends up around the edge 116 and partially across the second side 102*b* of the knob. The portion of the housing around the knob 102 is arranged or formed with an L shape. The first and second apertures (not shown) can be formed in the housing 106 and knob 102, respectively, such that (when the first and second apertures are aligned) the locking means 126 can extend through both the housing 106 and the knob 102 to facilitate locking of the knob. By arranging a housing which is configured to extend across at least part of the planar portion of the second side 102*b* of the knob, it is possible to retain the knob within the housing.

Figure 3A:
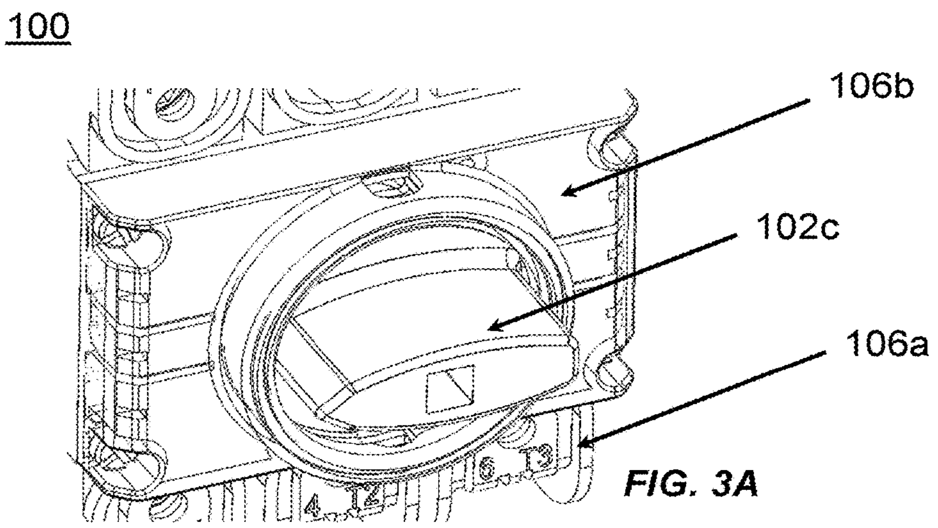
FIG. 3A illustrates a first perspective view of a portion of the device of the first aspect.
Figure 3B:
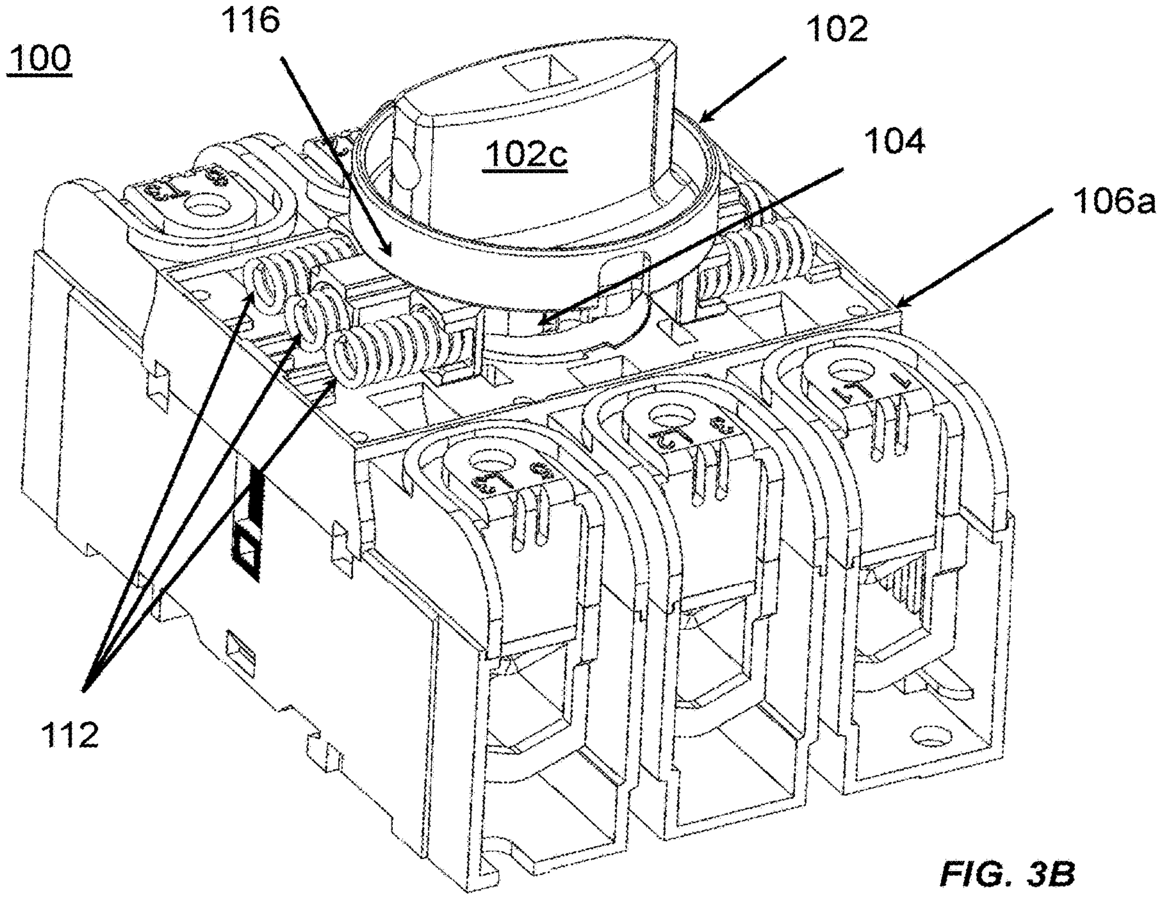
FIG. 3B illustrates a semi-transparent view of the device of FIG. 3A from a different orientation, showing an internal actuating mechanism located inside a portion of the housing of the device.

With reference to FIG. 3 (FIGS. 3A and 3B), the housing of an example of device 100 is described in more detail. FIG. 3A illustrates how a portion of the housing, here cover portion 106*b*, encloses part of the actuating mechanism and retains the actuation knob 102 within the housing, preventing removal of the actuating knob from the front of the device. In FIG. 3B, the cover portion 106*b* of the housing has been removed to better illustrate the actuating mechanism and the arrangement of the actuation knob 102, and it can be seen that part of the contact mechanism is still enclosed within main portion 106. However, it will be understood that, in some examples, a single housing component (can enclose both the contact mechanism and the first side of the actuation knob, the engagement portion configured to protrude through an opening in the housing. For example, the housing can define a single void or cavity, and the contact mechanism or switch and the first side of the actuation knob can be disposed within said cavity.

FIG. 3 further illustrates an example actuating mechanism of contact mechanism/switch of device 100. The actuating mechanism of this example comprises six springs 112 configured to be compressed by cam portion 104 upon rotation of the actuation knob 102 by a user (whether as a result of direct engagement or indirect engagement, e.g. via an external handle). The springs 112 may in turn act on the cam portion 104 to cause further rotation of the knob 102 (rotation driven independent of user rotation of the actuation knob) and drive the moveable contact into and out of contact with the first and/or second conductors, as appropriate. Any other biasing member may be used in addition to or in place of the springs shown in FIG. 3. Alternatively, any other suitable actuating mechanism may be drive by cam portion 104 of the actuation knob 102.

In some examples, a system may comprise the device 100 described herein and an external electrical circuit. The first and second conductors of the device are configured to be coupled to the electrical circuit such that the device 100 can open or close a current conduction path defined through the contact mechanism and around the electrical circuit. The system may be any system where a switch disconnector or isolator is used.

It is noted herein that while the above describes various examples of the isolating device of the first aspect, these descriptions should not be viewed in a limiting sense. Rather, there are several variations and modifications which may be made without departing from the scope of the present invention as defined in the appended claims.

The invention claimed is:

1. A device comprising:

a contact mechanism comprising:

a first conductor configured to be coupled to an external electrical circuit;

a second conductor configured to be coupled to the external electrical circuit;

a moveable contact; and an actuating mechanism configured to move the moveable contact between a first, closed, position in which a current conduction path is defined through the first, second and moveable conductors of the contact mechanism and a second, open, position in which no current conduction path is defined;

an actuation knob comprising:

a first side comprising a cam portion that directly engages with the actuating mechanism to drive the actuating mechanism upon rotation of the actuation knob to move the moveable contact;

a second side opposite the first side; and an engagement portion protruding from the second side and configured for engagement by a user; and a housing enclosing both the contact mechanism and the first side of the actuation knob, the engagement portion configured to protrude through an opening in the housing, wherein the actuation knob is configured to rotate within the housing in response to engagement by a user and wherein the housing is configured to extend across at least a planar portion of the second side of the actuation knob to retain the actuation knob within the housing.

2. The device of claim 1, further comprising one or more first apertures formed within the housing and one or more second apertures formed within the actuation knob, wherein the one or more first apertures are configured to align with the one or more second apertures when the moveable contact is in the second, open, position.

3. The device of claim 2, wherein, when the one or more first apertures are configured to align with the one or more second apertures, the housing and the actuation knob are configured to receive one or more locking means through the aligned first and second apertures to prevent rotation of the actuation knob within the housing.

4. The device of claim 2, wherein the one or more first apertures are configured not to align with the one or more second apertures when the moveable contact is in the first, closed, position.

5. The device of claim 2, further comprising one or more third apertures formed within the housing, wherein the one or more third apertures are configured to align with the one or more second apertures when the moveable contact is in first, closed, position.

6. The device of claim 2, wherein the one or more second apertures are formed at least partially within an edge of the actuation knob.

7. The device of claim 1, wherein the actuation knob is configured to rotate within the housing in response to direct engagement by the user.

8. The device of claim 1, further comprising a handle coupled to the engagement portion of the actuation knob, wherein the handle is configured for direct engagement by the user, such that the actuation knob is configured to rotate within the housing in response to indirect engagement by the user.

9. The device of claim 1, wherein the engagement portion and the cam portion of the actuation knob are integrally formed as a single component.

10. The device of claim 9, wherein the actuation knob is a single moulded component.

11. The device of claim 1, wherein the housing is further configured to extend over a lipped portion of the second side of the actuation knob to retain the knob within the housing.

12. The device of claim 1, further comprising a circular bearing disposed between the second side of the actuation knob and the housing.

13. The device of claim 1, wherein the housing comprises a main portion which encloses the contact mechanism and a cover portion coupled to the main portion, wherein the first side of the actuation knob is disposed between the main portion and the cover portion and enclosed within a cavity formed by the main portion and the cover portion.

14. A system comprising:

the device of claim 1; and an electrical circuit configured to be coupled to the first and second conductors of the contact mechanism.

15. The device of claim 1, wherein the actuation knob is integrally formed as a monolithic component, and wherein the first side and the second side are surfaces of the actuation knob that face opposite directions relative to one another.

16. The device of claim 1, wherein the actuation knob includes a circular edge extending about an entire outer circumference of the second side, and wherein the housing extends around a periphery of the circular edge arranged furthest from the second side.

17. The device of claim 16, wherein the housing extends around the periphery of the circular edge with a u-shaped portion so as to surround three sides of a cross-section of the circular edge.

18. The device of claim 16, wherein the housing extends around an entire circumferential periphery of the circular edge so as to fully cover the circular edge when viewed in a direction coincident with an axis of rotation of the actuation knob and extending from the second side of the actuation knob to the first side of the actuation knob.

19. The device of claim 1, wherein the engagement portion extends across an axis of rotation of the actuation knob about which the actuation knob is configured to rotate.

20. The device of claim 19, further comprising a handle coupled to the engagement portion of the actuation knob, wherein the engagement portion includes a polygonal recess extending along the axis of rotation, and wherein the handle is configured for direct engagement by the user, such that the actuation knob is configured to rotate within the housing in response to indirect engagement by the user.

* * * * *